United States Patent
Huang

(10) Patent No.: US 9,487,982 B2
(45) Date of Patent: Nov. 8, 2016

(54) PIVOTALLY ROTATING POSITIONER FOR A SUPPORT ILLUMINATING MULTI-TASK DEVICE AND THE SUPPORT ILLUMINATING MULTI-TASK DEVICE

(71) Applicant: Kuan-Lung Huang, New Taipei (TW)

(72) Inventor: Kuan-Lung Huang, New Taipei (TW)

(*) Notice: Subject to any disclaimer, the term of this patent is extended or adjusted under 35 U.S.C. 154(b) by 19 days.

(21) Appl. No.: 14/790,916

(22) Filed: Jul. 2, 2015

(65) Prior Publication Data

US 2016/0002964 A1  Jan. 7, 2016

(30) Foreign Application Priority Data

Jul. 3, 2014 (TW) .............................. 103211858 U

(51) Int. Cl.

| | | |
|---|---|---|
| *F21V 33/00* | (2006.01) | |
| *E05D 11/00* | (2006.01) | |
| *F16M 11/38* | (2006.01) | |
| *H04M 1/04* | (2006.01) | |
| *E05D 11/10* | (2006.01) | |
| *F21W 131/30* | (2006.01) | |
| *H04M 1/02* | (2006.01) | |
| *F21Y 101/00* | (2016.01) | |

(52) U.S. Cl.
CPC ........... *E05D 11/0081* (2013.01); *F16M 11/38* (2013.01); *H04M 1/04* (2013.01); *E05D 11/1078* (2013.01); *E05D 2011/1035* (2013.01); *E05Y 2900/606* (2013.01); *F21V 33/0048* (2013.01); *F21W 2131/30* (2013.01); *F21Y 2101/00* (2013.01); *H04M 1/0214* (2013.01)

(58) Field of Classification Search
CPC ........... E05D 11/0081; E05D 11/1078; E05D 2011/1035; F16M 11/38; H04M 1/04; H04M 1/0214; F21Y 2101/00; E05Y 2900/606; F21W 2131/30; F21V 33/0048
See application file for complete search history.

(56) References Cited

U.S. PATENT DOCUMENTS

| 8,041,399 | B2* | 10/2011 | Jarczyk | H04N 9/3141 |
| | | | | 455/556.1 |
| 2007/0265030 | A1* | 11/2007 | Moon | H04M 1/04 |
| | | | | 455/550.1 |
| 2009/0221333 | A1* | 9/2009 | Harvey | H04M 1/04 |
| | | | | 455/575.1 |
| 2011/0098087 | A1* | 4/2011 | Tseng | G01C 21/265 |
| | | | | 455/557 |
| 2012/0047686 | A1* | 3/2012 | Hautamaki | G06F 1/1637 |
| | | | | 16/366 |
| 2014/0263939 | A1* | 9/2014 | Rinner | F16M 11/10 |
| | | | | 248/688 |

\* cited by examiner

*Primary Examiner* — Donald Raleigh
(74) *Attorney, Agent, or Firm* — Wang Law Firm, Inc.

(57) ABSTRACT

A pivotally rotating positioner for a support illuminating multi-task device which can be applied to conductively connect a light rotating arm to a body in a fashion of pivotal rotations at variable angles. However, upon pivotally rotating, it is possible to compress the electrically conductive spring to prevent serious abrasions in the snapping recesses and the snapping bumps on the rotating arm case and the base housing. Moreover, by means of the elastic coercion between the electrically conductive spring and the electrically conductive pivotal axis assembly, it is possible to allow the electrical energy coming from the body to be smoothly provided to the light rotating arm via the pivotal axis and also enable a free rotation of 360 degrees of the light rotating arm with respect to the body while maintaining the illumination effect.

13 Claims, 11 Drawing Sheets

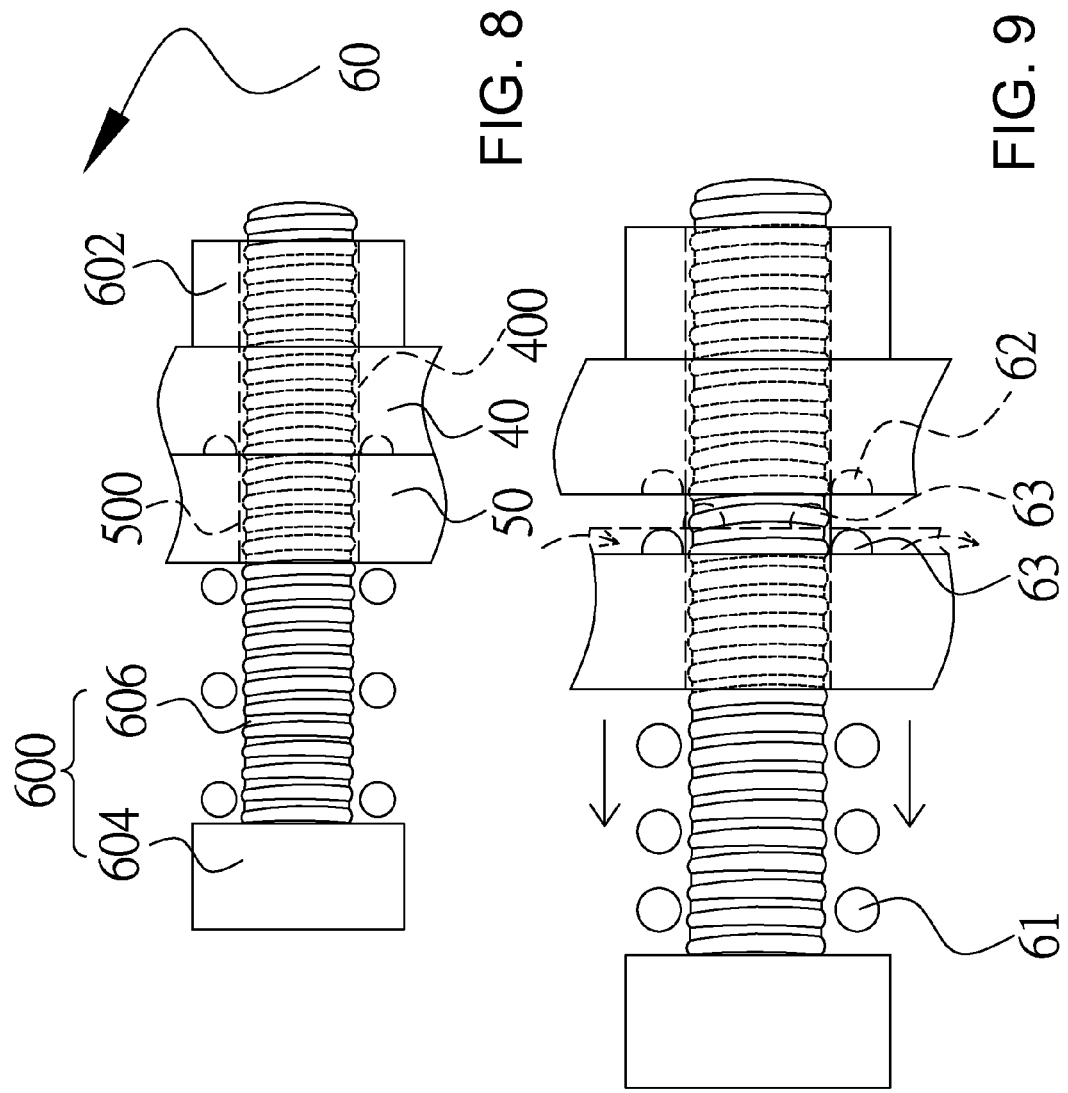

PIVOTALLY ROTATING POSITIONER FOR A SUPPORT ILLUMINATING MULTI-TASK DEVICE AND THE SUPPORT ILLUMINATING MULTI-TASK DEVICE

CROSS REFERENCE TO RELATED APPLICATION

This application claims the benefit of priority to TW 103211858, filed on Jul. 3, 2014 with the Intellectual Property Office of the Republic of China, Taiwan, the entire specification of which is incorporated by reference herein.

FIELD OF THE INVENTION

The present invention generally relates to a pivotally rotating positioner; in particular, the present invention relates to a pivotally rotating positioner for a support illuminating multi-task device and the support illuminating multi-task device utilizing the pivotally rotating positioner.

BACKGROUND OF THE INVENTION

Currently, mobile phones and tablet computers are more and more popular, and their functions are no longer limited to purely telephone calls, but already evolve from earlier simple communications into audio/video transmissions. Although this type of functions are widely accepted by numerous users, electric power consumptions thereof also increase significantly at the same time; therefore, people are now paying greater attention to the stand-by time of portable communication devices such as mobile phones and tablet computers, resulting in the emergence of new products like mobile power source etc. Besides, a user may watch a mobile phone or a tablet computer acting as a player for audio/video files for a quite long duration of time, typical hand-held operations may become pretty inconvenient, thus leading to elevated demands on products such as supportive frames or the like.

Especially, as such a sort of products like mobile power supply have been widely utilized, many vendors now further attempt to add more functions to the original mobile power supply. In addition, it is noticed that the functions of the tablet computer are gradually close to the counterparts found on notebook computers, but the input/output devices and connection ports being simplified, and the advantages may include the less complicated structure and more compact size than notebook computers, whereas the drawbacks may lie in inconvenience on input/output operations and probably insufficient connection ports upon connecting multiple external peripheral devices thereto.

However, once the mobile power supply and the supportive frame are integrated, in addition to an illuminating function, for example, thus together forming a multi-task device, it is inevitable to encounter the following problems. The supportive frame needs to firmly hold a device like a mobile phone or tablet computer in position at a tilted angle, and also allow to save space under a retraction state without protrusions from the frame, so the inventor of the present invention designed a prior product as shown in FIG. 1, wherein the mobile power supper may act as the body 1, and a set of light rotating arms 2 are pivotally configured on the lateral side of the body 1 with the pivotal connection. The light rotating arm 2 comprises a pair of rotating arm cases 20 and a blocking part 21 installed on the pair of the rotating arm cases 20, and a set of light source 210 exemplified as light emitting diodes is configured in the blocking part 21.

In order to be applied as a supportive frame, it is possible to first pivotally rotate the body 1 with respect to the light rotating arm 2 so that the light rotating arm 2 can function as a base, then the body 1 can be upwardly tilted to form an angle relatively to the light rotating arm 2 to act as a rear support, and the lower edge of the mobile phone 9 or tablet computer can be blocked by the blocking part 21 in the front so as to be stably placed on the multi-task device thus enabling long-time movie watching or video phone communications. Contrarily, to retract the device, it needs only to rotate reversely the light rotating arm 2 to let the rotating arm cases return to the lateral side of the body 1, as shown in FIG. 2, and then rotate the blocking part 21 to the front side of the body 1 thus allowing the multi-task device integrally to be in a retraction state of an approximately rectangular shape.

Furthermore, as shown in FIGS. 3 and 4, it is possible to install a standing board 12 on one side of the body 1 such that the body 1 can stand alone on the surface of a table, while the light rotating arm 2 can be rotated 180 degrees from the lateral side of the body 1 thus allowing the blocking part 21 to be away from the body 1 and starting the light source 210 in the blocking part 21 to act as a table lamp.

In order to enable the stable positioning of the rotating arm case 20 at such different angles with respect to the body 1, a pivotally rotating positioning structure is required between them. Besides, in order to provide manufacture convenience and economical product costs, next refer conjunctively to FIGS. 5 and 6, wherein the rotating arm cases 2 and the base housing 10 of the body 1 are all fabricated by materials suitable for injection molding processes, e.g., plastics. Consequently, the simplest design for such a pivotally rotating positioning structure 3 is, on the two facing lateral sides of the aforementioned rotating arm case 20 and the base housing 10, multiple semi-spherical, for example, protrusive grains 30 may be formed on the surface of one of the two sides, while multiple semi-spherical positioning recesses 31 may be formed on the relative surface of the other one such that, once located at a predetermined relative angle, the protrusive grains 30 may correspond to the positioning recesses 31 so as to naturally provide the positioning snapping function.

Unfortunately, after many repetitive pivotal rotation tests during the research and development stage, the protrusive grains 30 made by plastic materials may be rapidly worn off, thus being completely unable to position at the aforementioned specific angles.

Meanwhile, since the light source 210 is configured within the light rotating arm 2 and located on an end remote from the body 1, electric energy needs to go to the light source 210 from the body 1 by way of the pivotal axis, but considering a user may pivotally rotate the light rotating arm 2 360 degrees with respect to the body 1, it is hence required to allow electric energy to successfully reach at the light source 210 of the blocking part 21 through the pivotal rotation structure, and at the same time, the manufacture cost issue may restrict the utilization of the currently available electrically conductive pivotal axis assembly; also, to ensure the electrical conduction stability, complicated structures, e.g., electric brushes or carbon films etc., may not be applicable. As for direct hard-wire connections, it may not satisfy the requirement on electrical conduction of 360 degree rotations.

Accordingly, the major issues to be resolved by the present invention may concern how to allow the light rotating arm of the support illuminating multi-task device to pivotally rotate 360 degrees with respect to the body, to ensure the stable electric conduction under cost control conditions so that light source power may not be interrupted, and, in particular, to successfully maintain the stable positioning effect at specific locations after long-term utilizations of the electrically conductive pivotal axis assembly. Furthermore, it is possible to additionally integrate more connection ports and wireless communication modules on the support illuminating multi-task device so as to further improve the application flexibility of the support illuminating multi-task device thereby offering more effects.

SUMMARY OF THE INVENTION

An objective of the present invention is to provide a pivotally rotating positioner for a support illuminating multi-task device thereby ensuring stable electric power supplied to the light source in the light rotating arm when the light rotating arm rotates 360 degrees with respect to the body.

Another objective of the present invention is to provide a pivotally rotating positioner for a support illuminating multi-task device thereby ensuring the light rotating arm can be firmly snapped in position at a predetermined position when the light rotating arm pivotally rotates with respect to the body.

Yet another objective of the present invention is to provide a pivotally rotating positioner for a support illuminating multi-task device, which uses the light rotating arm as the base, the body as the rear support, and provides the position limitation feature by means of the blocking part on the light rotating arm so as to conjunctively constitute a stable support structure.

Still another objective of the present invention is to provide a support illuminating multi-task device, in which the light support thereof can rotate 360 degrees thereby allowing the light rotating arm to pivotally rotate freely without power supply issues.

Yet still another objective of the present invention is to provide a support illuminating multi-task device, in which the light support and the body can be firmly positioned at multiple predetermined pivotal rotation positions thereby enhancing application flexibility.

To achieve the above-said objectives, the present invention provides a pivotally rotating positioner for a support illuminating multi-task device, which is used to conductively connect a light rotating arm to a body in a fashion of pivotal rotations at variable angles, wherein the body comprises a base housing and a power supply assembly installed within the base housing, the base housing is configured with at least a pair of positioning through-holes; and the light rotating arm comprises a pair of rotating arm cases and a blocking part installed on the aforementioned pair of rotating arm cases, wherein the aforementioned pair of rotating arm cases are respectively configured with a penetrating part corresponding to one of the positioning through-holes, and the blocking part further includes a light source formed by a set of light emitting diodes, the pivotally rotating positioner comprising: a pair of electrically conductive pivotal axis assemblies, each of the aforementioned electrically conductive pivotal axis assembly respectively having two mutually opposite radial expansion position-limiting parts, and a radial contracting part located between the aforementioned radial expansion position-limiting parts, in each of the aforementioned conductive pivotal axis assembly the radial contracting part respectively penetrating correspondingly the aforementioned penetrating part and the aforementioned positioning through-hole, thereby limiting the farthest distance between the aforementioned base housing and the aforementioned rotating arm case by means of the aforementioned radial expansion position-limiting part such that the aforementioned rotating arm case can be combined to the aforementioned body in a fashion of pivotal rotations; a pair of electrically conductive springs, respectively sleeve installed on the aforementioned radial contracting part of the aforementioned electrically conductive pivotal axis assembly, and one end of the aforementioned electrically conductive spring being conductively abutted against one of the aforementioned radial expansion position-limiting part so as to provide an elastic push force to abut thereon such that the aforementioned base housing and the aforementioned rotating arm case can be elastically and tightly coerced with each other; two sets of snapping recesses and snapping bumps, respectively formed on the aforementioned base housing and the aforementioned rotating arm case thus allowing the aforementioned rotating arm case to be relatively positioned at at least two predetermined positions upon pivotally rotating relatively to the aforementioned base housing along the aforementioned electrically conductive pivotal axis assembly.

Further, a support illuminating multi-task device using the above-said pivotally rotating positioner comprises: a body, including a base housing and a power supply assembly installed within the base housing, with the base housing being configured with at least a pair of positioning through-holes; a light rotating arm conductively connected to the body in a fashion of pivotal rotations at variable angles, which further includes a pair of rotating arm cases and a blocking part installed on the aforementioned rotating arm case, wherein the aforementioned rotating arm cases are further respectively configured with a penetrating part corresponding to one of the aforementioned positioning through-holes, and the blocking part further includes a light source formed by a set of light emitting diodes; and a set of pivotally rotating positioners, comprising: a pair of electrically conductive pivotal axis assemblies, each of the aforementioned electrically conductive pivotal axis assembly respectively having two mutually opposite radial expansion position-limiting parts, and a radial contracting part located between the aforementioned radial expansion position-limiting parts, in the aforementioned conductive pivotal axis assembly the radial contracting part respectively penetrating correspondingly the aforementioned penetrating part and the aforementioned positioning through-hole, thereby limiting the farthest distance between the aforementioned base housing and the aforementioned rotating arm case by means of the aforementioned radial expansion position-limiting part such that the aforementioned rotating arm case can be combined to the aforementioned body in a fashion of pivotal rotations; a pair of electrically conductive springs, respectively sleeve installed on the aforementioned radial contracting part of the aforementioned electrically conductive pivotal axis assembly, and one end of the aforementioned electrically conductive spring being conductively abutted against one of the aforementioned radial expansion position-limiting part so as to provide an elastic push force to abut thereon such that the aforementioned base housing and the aforementioned rotating arm case can be elastically and tightly coerced with each other; and two sets of snapping recesses and snapping bumps, respectively formed on the aforementioned base housing and the aforementioned rotating arm case thus allowing the aforementioned rotating arm case to be relatively positioned at at least two predetermined positions upon pivotally rotating relatively to the aforementioned base housing along the aforementioned electrically conductive pivotal axis assembly.

By restricting the distance between the base housing and the rotating arm case with the electrically conductive pivotal axis assembly and using the elastic coercion force applied by the electrically conductive spring, it is possible, on one hand, to enable the relative snapping positioning when the base housing and the rotating arm case are located at the predetermined position, and also, upon the light rotating arm rotating with respect to the body, the retraction of the electrically conductive spring may provide the space for free rotations without serious abrasion problems between the snapping recesses and the snapping bumps. Meanwhile, on the other hand, it can ensure that the electrically conductive spring is not fixedly connected to the electrically conductive pivotal axis assembly thereby allowing the light rotating arm to pivotally rotate 360 degrees freely with respect to the body, and also guarantee that the electrically conductive spring can electrically contact the electrically conductive pivotal axis assembly in a sustained fashion such that the light rotating arm can securely provide electric power thus resolving all of the issues set forth hereinbefore. Moreover, the body may be additionally configured with connection ports, wireless communication modules or the like for further enhancing the application flexibility of the support multi-task device according to the present invention.

BRIEF DESCRIPTION OF THE DRAWINGS

FIGS. 8 and 9 are enlarged lateral views for the embodiment in FIG. 7, illustrating the operation mechanism for each portion in the pivotally rotating positioner when the rotating arm case and the base housing are under the relative positioning state and the pivotal rotation state, respectively;

DETAILED DESCRIPTION OF THE ILLUSTRATED EMBODIMENTS

The aforementioned and other technical contents, aspects and effects in relation with the present invention can be clearly appreciated through the detailed descriptions concerning the preferred embodiments of the present invention in conjunction with the appended drawings; moreover, in each embodiment, the same components will be denoted with similar numbers.

Figure 7:
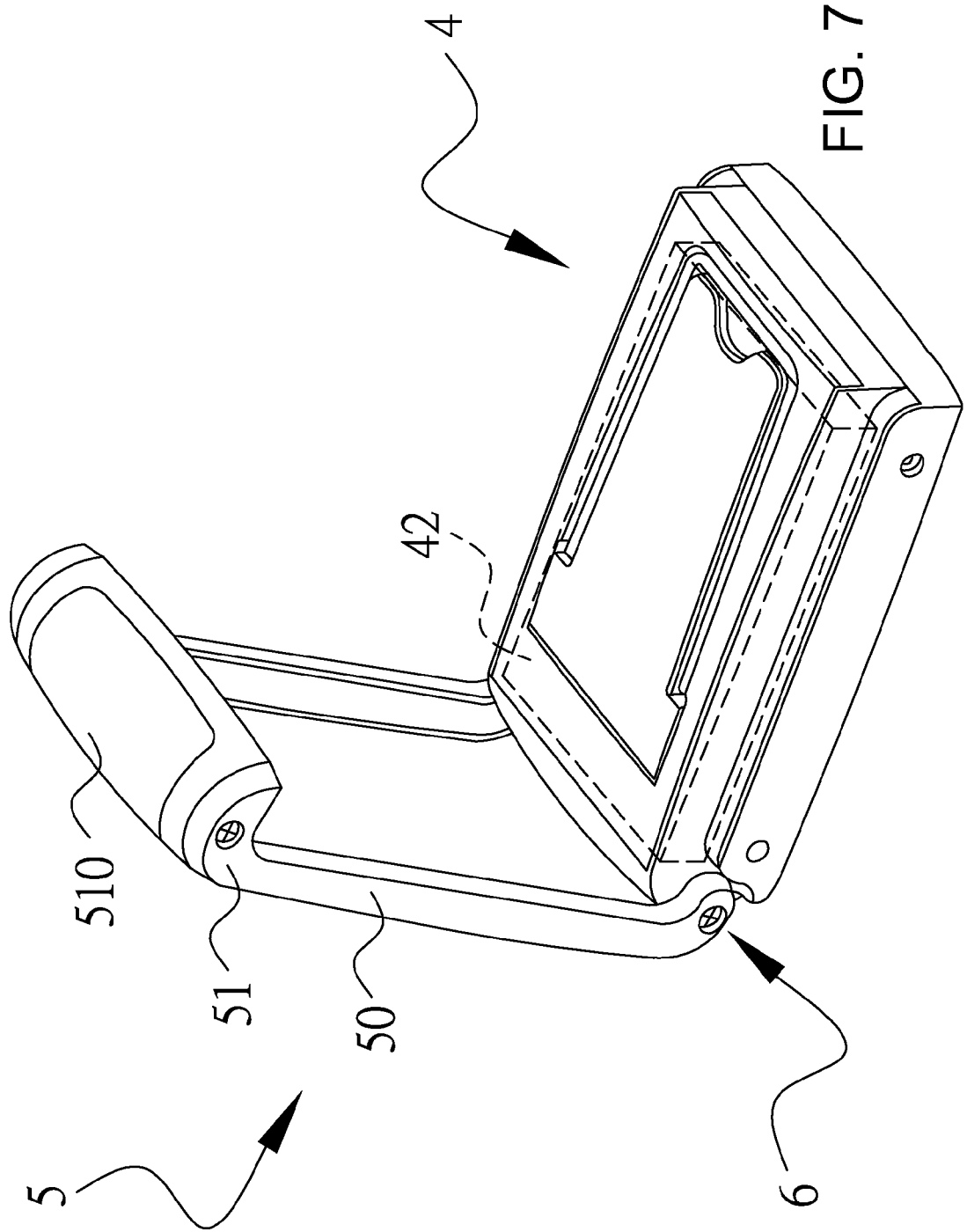
FIG. 7 shows an application state stereo view for the support illuminating multi-task device of a first preferred embodiment according to the present invention.

Referring to FIGS. 7 and 8, certain structures demonstrated in the present embodiment are identical to the prior support illuminating multi-task previously developed by the applicant of the present invention, which essentially comprises a body 4, a light rotating arm 5 conductively connected to the body in a fashion of pivotal rotations at variable angles, and a set of pivotally rotating positioner 6.

Figure 1:
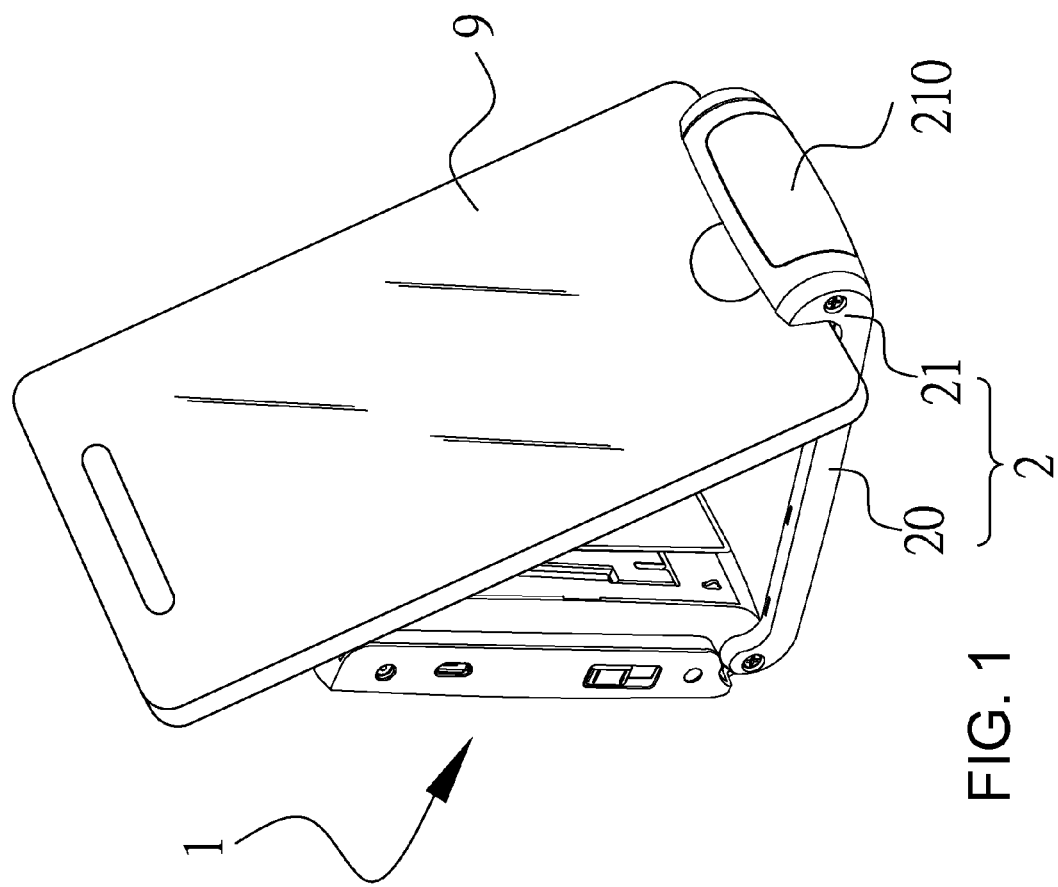
FIG. 1 shows an application state stereo view for a prior support illuminating multi-task device previously developed by the applicant of the present invention, which may function as a supporting frame thereby illustrating the positioning of the body rotated to a tilted position with respect to the light rotating arm.
Figure 2:
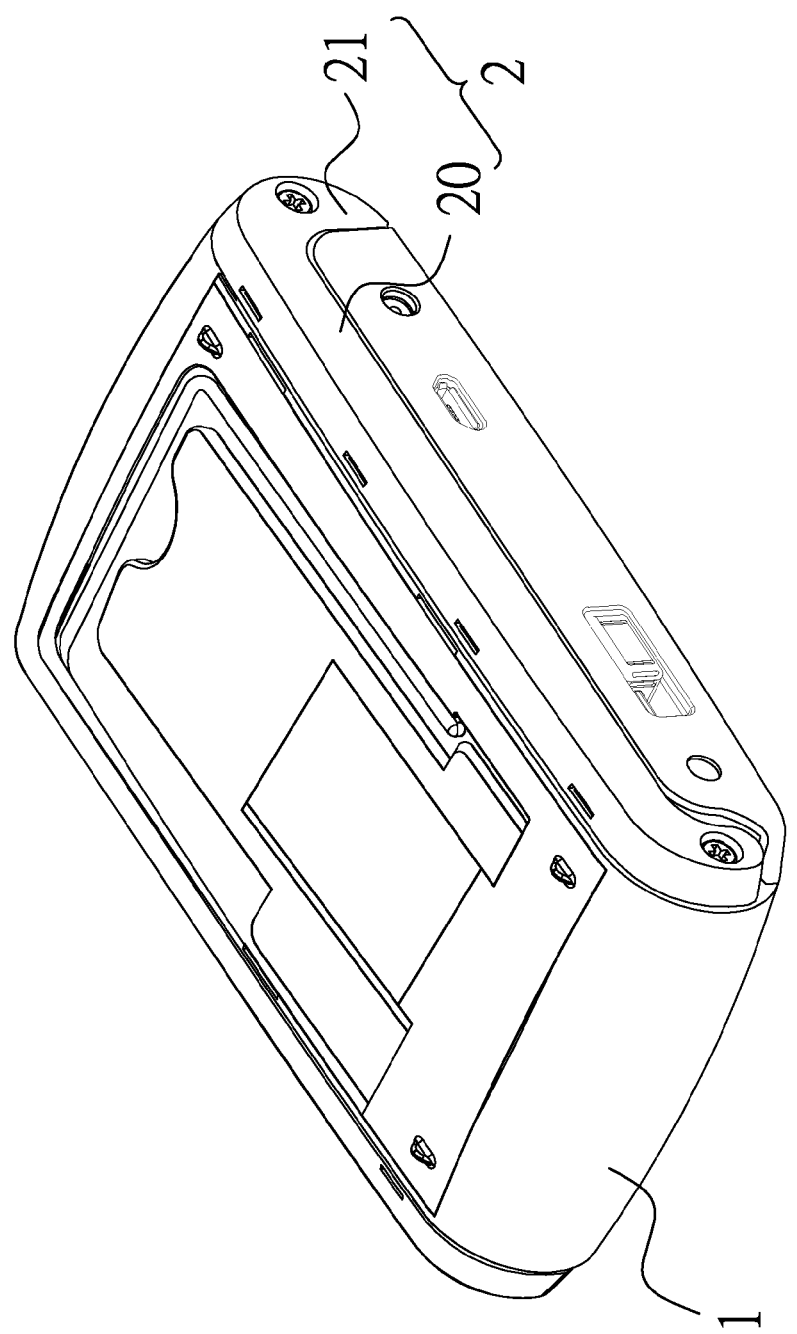
FIG. 2 shows a retraction state stereo view for FIG. 1, illustrating that the light rotating arm is rotated and positioned to a retraction position.
Figure 3:
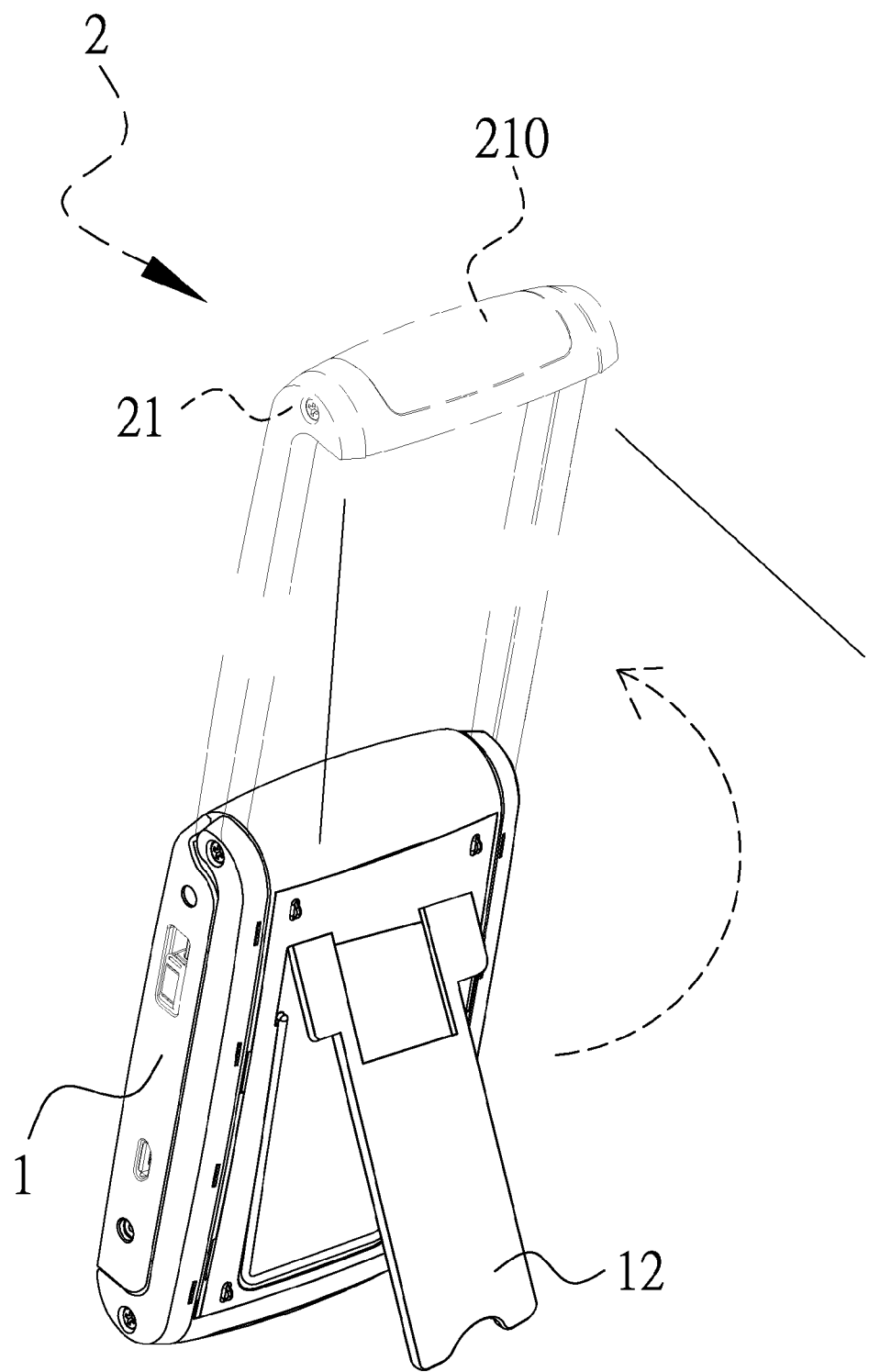
FIG. 3 shows an application state stereo view for FIG. 1, illustrating a situation in which the light rotating arm is rotated to a position of 180 degree with respect to the body thus acting as a table lamp.
Figure 4:
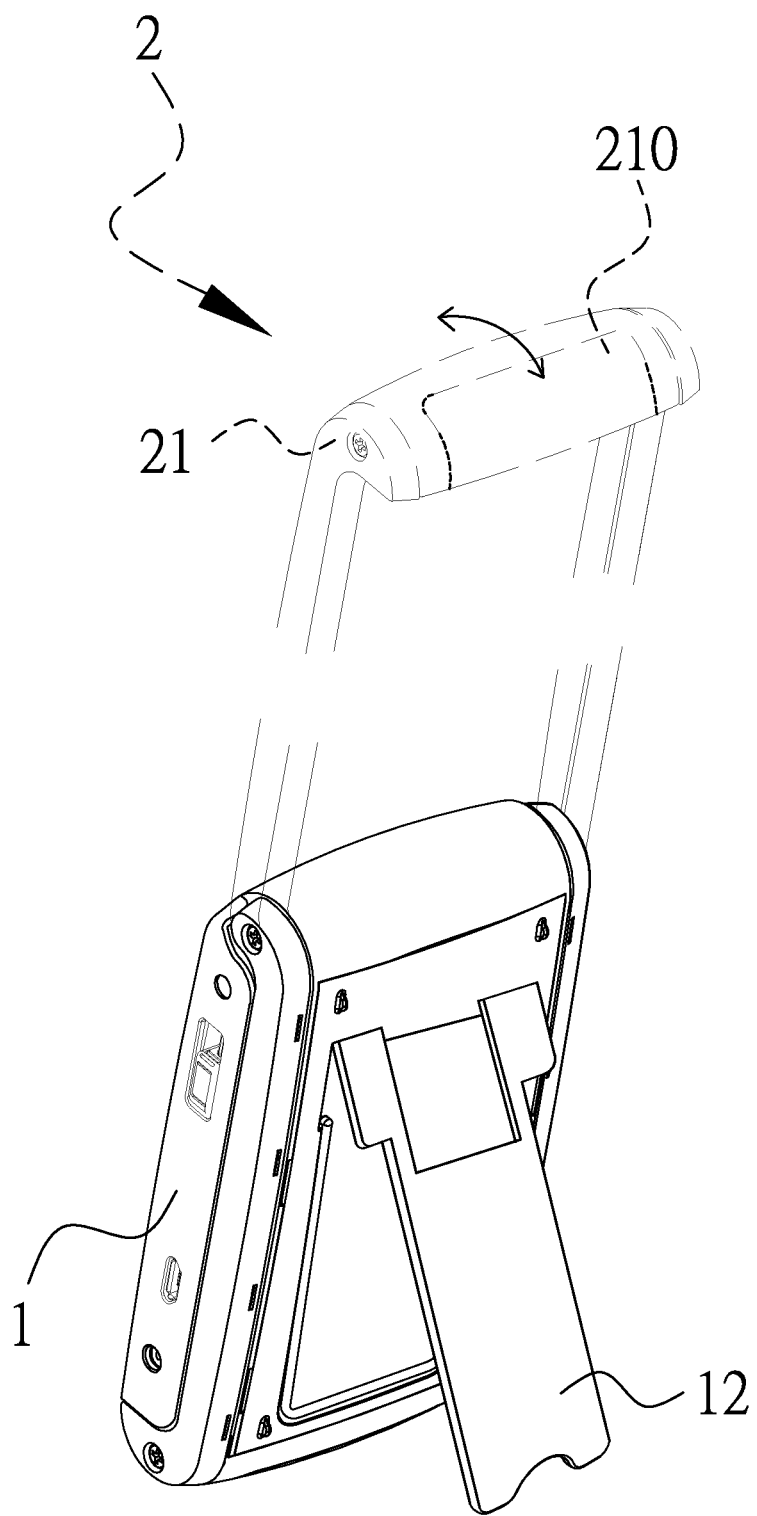
FIG. 4 shows an application state stereo view for FIG. 3, illustrating that the light source can pivotally rotate relatively to the rotating arm case.
Figure 5:
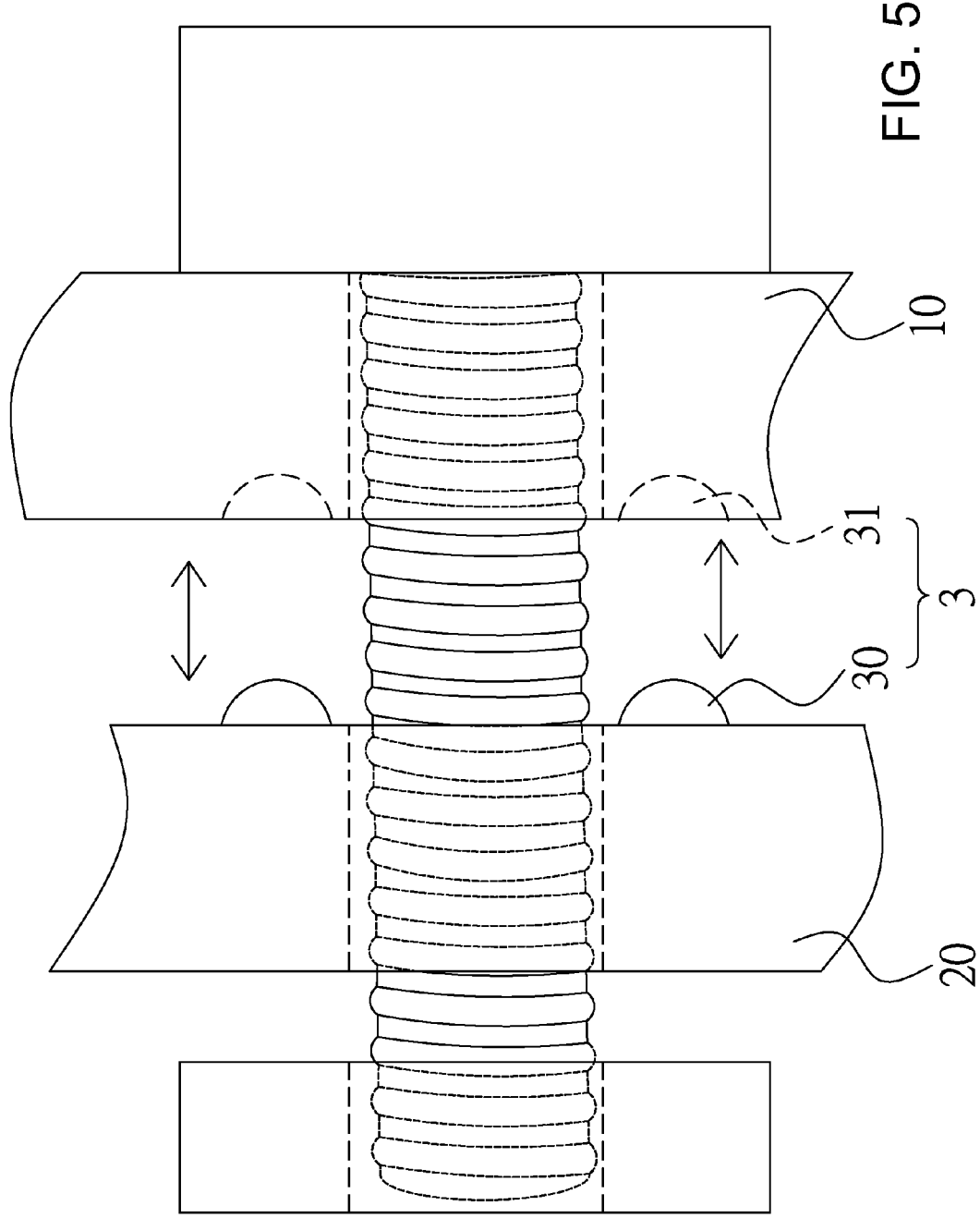
FIG. 5 shows a lateral view of the pivotal rotation positioning structure for FIG. 1, illustrating the mutual abrasions between the protrusive grains and the positioning recesses.
Figure 6:
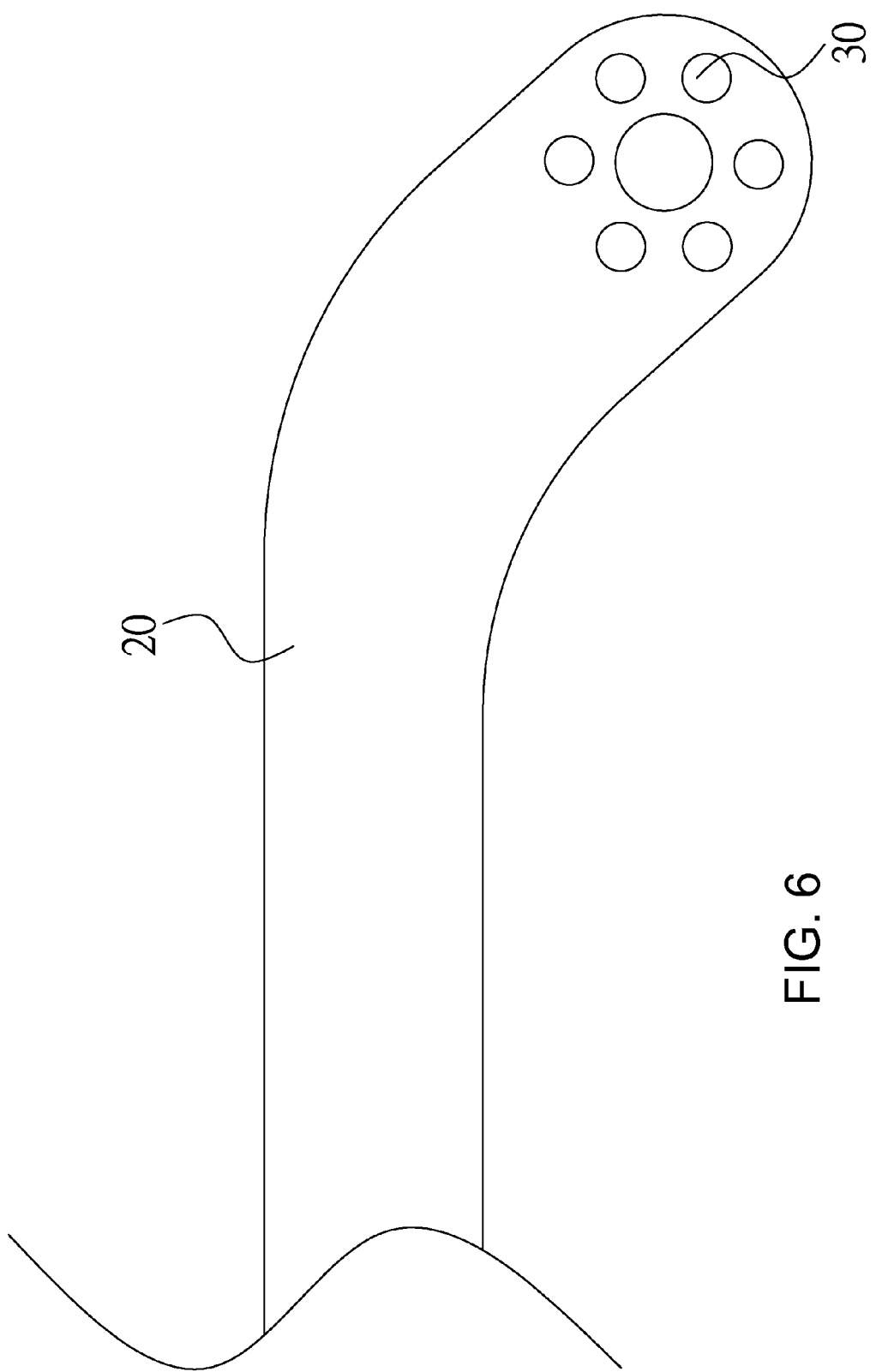
FIG. 6 shows a partially enlarged view of the rotating arm case in FIG. 1, illustrating the allocation of the protrusive grains.

Herein the body 4, as the counterpart in FIG. 1, comprises a base housing 40 and a power supply assembly 42 configured as the rechargeable battery within the base housing, the base housing 40 has at least a pair of positioning through-holes 400; the light rotating arm 5 includes a pair of rotating arm cases 50 and a blocking part 51 installed on the pair of the rotating arm cases 50, wherein the pair of rotating arm cases 50 are further respectively configured with a penetrating part corresponding to the aforementioned positioning through-hole 400, and the blocking part 51 further has a set of light source 510 exemplified as light emitting diodes. Without doubt, those skilled ones in the art may conveniently appreciate that the power supply assembly set forth as above may not be limited to the illustrated rechargeable battery, but the connection to conventional power grid capable of supplying sufficient electric energy may be also applicable to support the operations of the present invention, so the alternations and modifications thereof are obvious and do not impede implementations for the technical characteristics of the present invention.

Regarding to the pivotally rotating positioner 6 disclosed in the present invention, since its structure is configured as being two-by-two symmetric, only one side thereof is shown in FIGS. 8 and 9. The pivotally rotating positioner 6 according to the present invention further comprises a pair of electrically conductive pivotal axis assemblies 60, a pair of electrically conductive springs 61, and two sets of snapping recesses 62 and snapping bumps 63, with each set of electrically conductive pivotal axis assembly 60 being exemplified as a metal screw bolt 600 as well as a corresponding metal screw nut 602; since the external diameters of the metal screw nut 602 and the screw head 604 of the metal screw bolt 600 are both greater than the screw teeth 606 of the metal screw bolt 600, in order to emphasize the structural feature of this portion, the metal screw nut 602 and the screw head 604 are herein respectively referred as the radial expansion position-limiting part, and comparatively, the screw teeth 606 between the metal screw nut 602 and the screw head 604 are referred as the radial contracting part.

With a view to combine the aforementioned rotating arm case 50 to the aforementioned base housing 40 in a pivotally rotating fashion, in the present example, the screw teeth 606 of the metal screw bolt 600 can sequentially penetrate through the electrically conductive spring 61, the penetrating part on the rotating arm case 50, then the positioning through-hole 400 on the base housing 40 and finally the metal screw nut 602 thus being screw jointed. The penetrating part in the present example also consists of the through-holes 500 respectively located on the two sides. Moreover, the distance between the screw head 604 and the metal screw nut 602 is deliberately selected to be greater than the sum of the thicknesses in the penetrating part of the rotating arm case 50 and the positioning through-hole 400 of the base housing 40, and, using the distance between such two radial expansion position-limiting parts, it is possible to restrict the longest distance between the aforementioned base housing 40 and the aforementioned rotating arm case 50 thereby enabling the bi-directional squeezing deformation in the electrically conductive spring 61 by the screw head 604 and the rotating arm case 50.

In addition, the elastic restoration force from the squeezed electrically conductive spring 61 can drive the rotating arm case 50 and the base housing 40 to mutually approach. In the present embodiment, on the aforementioned rotating arm case 50 there configure six semi-spherical bumps, for example, to act as the snapping bumps 63, and such six semi-spherical bumps are radially symmetric with respect to the above-said through-hole 500 as the center, such that each two adjacent semi-spherical bumps mutually create an angle of 60 degrees, while multiple corresponding snapping recesses are formed on the base housing 40. Once the snapping bumps 63 on the rotating arm case 50 happen to match the snapping recesses 62 on the base housing 40, the rotating arm case 50 can be pressed by the electrically conductive spring 61 to closely abut against the base housing 40 so that the light rotating arm 5 and the body 4 can be relatively positioned and a predetermined relative positioning location exists in every 60 degrees. Of course, those skilled ones in the art can easily appreciate that the illustrated number in the present embodiment is by no means a restriction.

Figure 10:
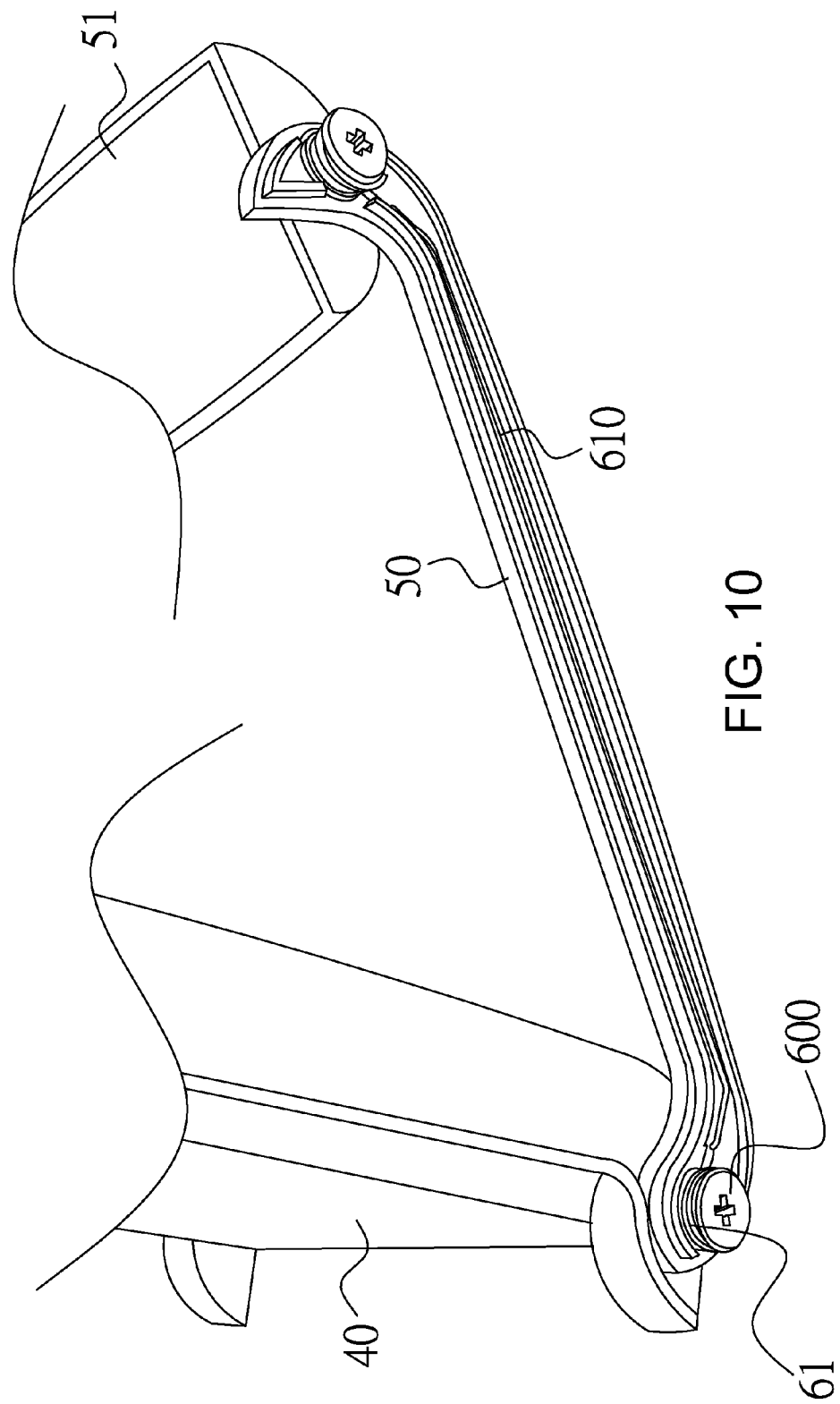
FIG. 10 shows a structural view for the embodiment in FIG. 7 upon the electrically conductive spring being located in the rotating arm case, illustrating that the electrically conductive spring and the conductive line segments are integrally formed.

In addition, the aforementioned two electrically conductive springs 61 are respectively sleeve installed to the screw teeth 606 of the aforementioned metal screw bolt 600, and one end thereof is forced to conductively abut against the screw head 604 while the other end provides the elastic push-abutting feature, so the aforementioned rotating arm case 50 can elastically abut against the aforementioned base housing 40, and thus the electrically conductive spring 61 can be conductively connected to the metal screw bolt 600 firmly without being directly fixed onto the metal screw bolt 600. Especially, in the present embodiment, referring conjunctively to FIG. 10, the illustrated electrically conductive spring 61 is a bended and extended stainless wire and extends out a conductive line segment 610 integrally along the rotating arm case 50, while another spring part can similarly wound on the end remote from the electrically conductive pivotal axis assembly 50, such that an identical conjunction structure of the electrical conductive pivotal axis assembly and the electrically conductive spring can be formed between the blocking part 51 and the rotating arm case 50 thereby allowing the blocking part 51 to freely rotate 360 degrees relatively to the rotating arm case 50 and transfer electric energy to the light source 510 in the blocking part 51 all the way from the body 4.

Through the structure set forth hereinbefore, the pivotally rotating positioner according to the present invention applies a simple structure to provide, on one hand, an uninterrupted power supply effect while the pivotal axis can rotate 360 degrees, and also have mechanical buffering and coercion functions on the other hand, so that, when the rotating arm case rotates along the pivotal axis, the snapping bumps and the snapping recesses can mutually retract due to further compressions by the electrically conductive spring without abrasions therein between so as to ensure the durability and stability of the pivotally rotating positioner.

Figure 11:
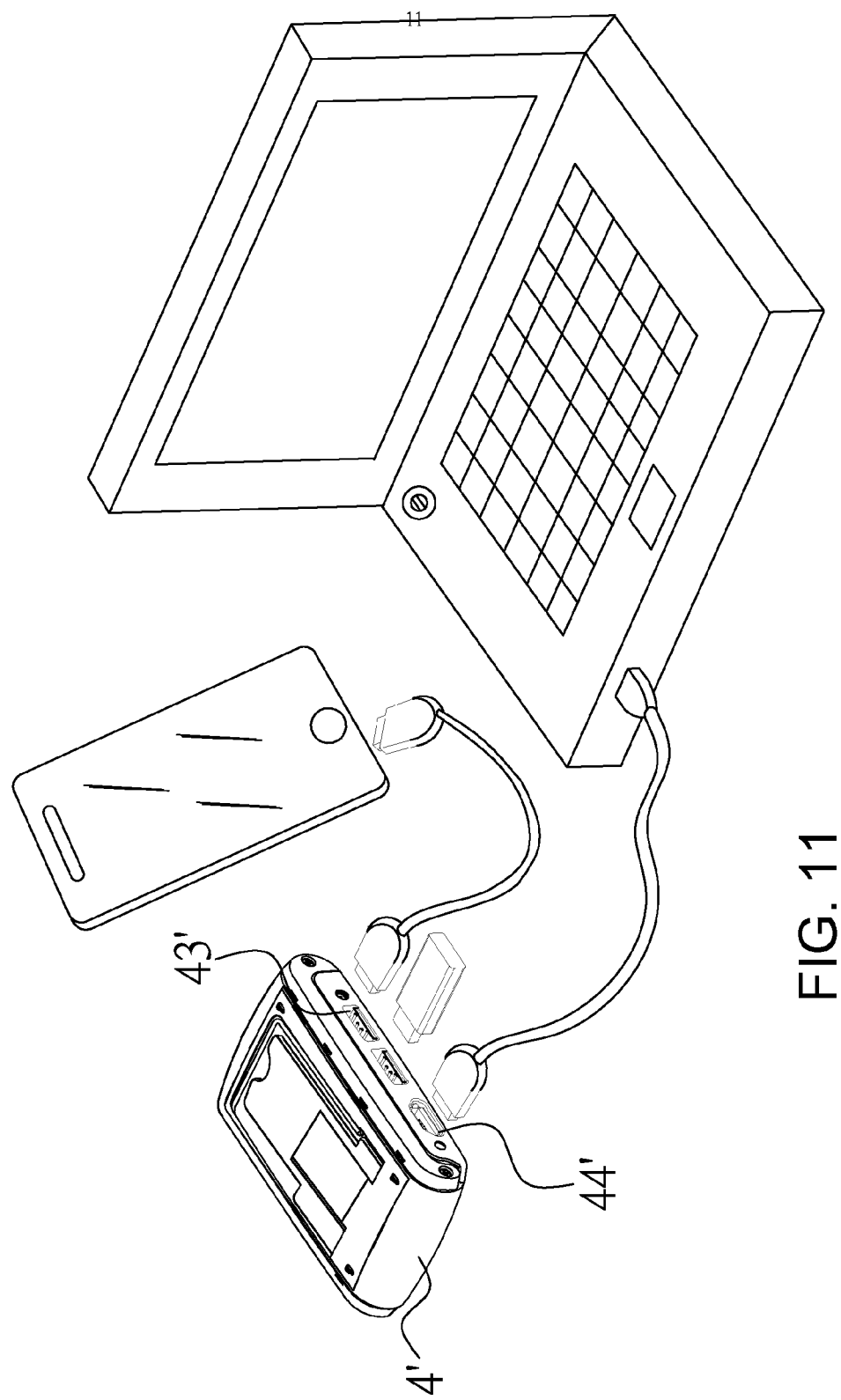
FIG. 11 shows an application state stereo view for a second preferred embodiment according to the present invention.
Figure 12:
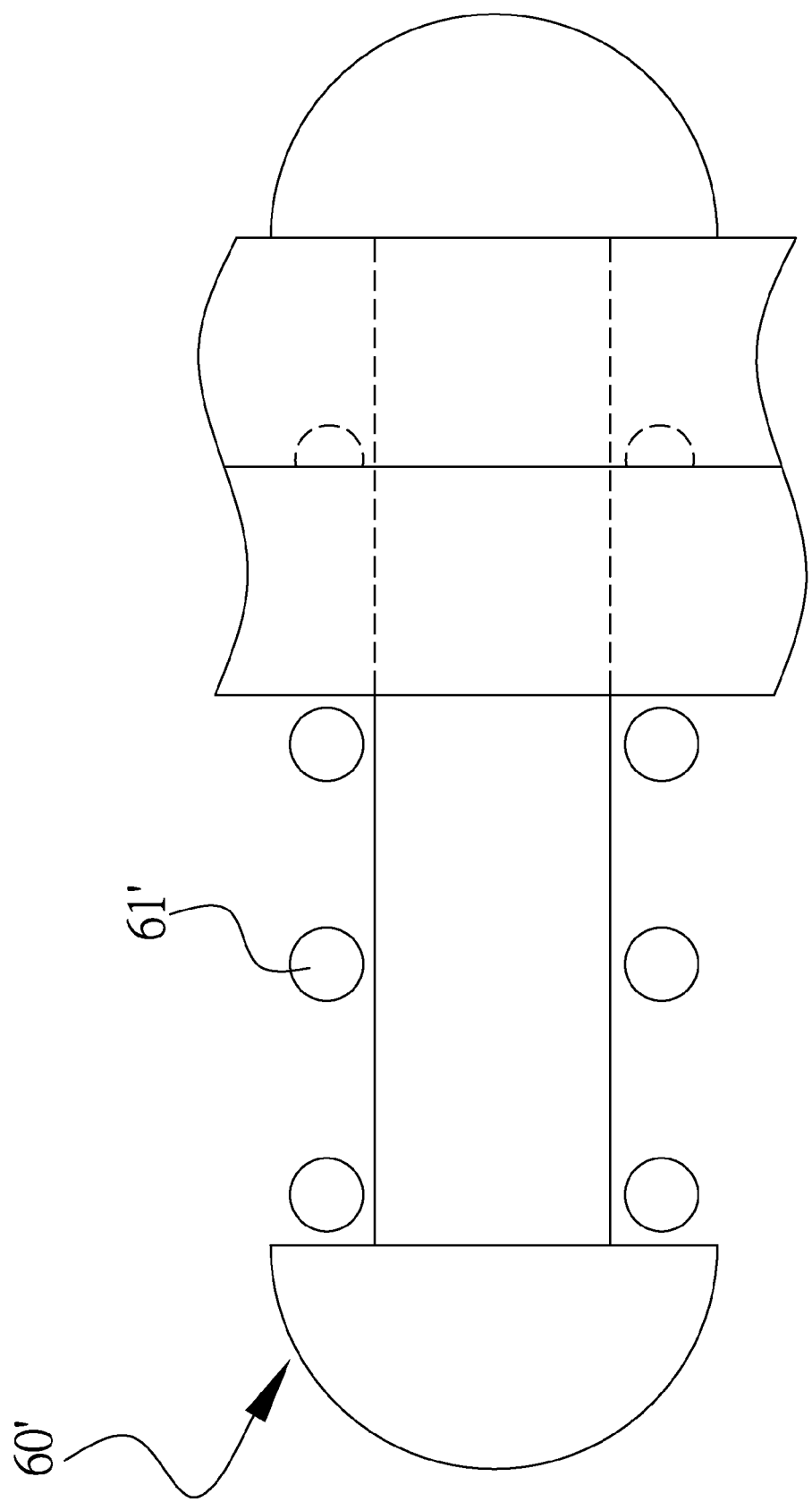
FIG. 12 shows an enlarged lateral view for a pivotally rotating positioner of the second preferred embodiment according to the present invention.

Surely, those skilled ones in the art can easily understand that the illustrated metal screw bolt and the metal screw nut in the previous embodiment are by no means limitations, the electrically conductive spring and the conductive line segment are not required to be integrally formed, and more functional modules may be added into the body. Hence, as shown in FIG. 11, in a second preferred embodiment according to the present invention, the body 4' can be further configured with multiple USB HUB modules 43' and connection ports 44' thereby allowing the support illuminating multi-task device of the present embodiment to be connected to a notebook computer, a tablet computer, a smart mobile phone and enable various transmission devices so that the problem of insufficient connection ports on a tablet computer or a mobile phone can be effectively resolved.

Furthermore, in the present embodiment, a rivet 60' is utilized to act as the electrically conductive pivotal axis assembly which similarly allows the electrically conductive spring 61' to be sleeve installed therein so as to achieve the power conduction of 360-degree pivotal rotation and also avoid abrasions in the snapping bumps.

In summary, the pivotally rotating positioner for a support illuminating multi-task device and the support illuminating multi-task device using the pivotally rotating positioner according to the present invention can be implemented with a simple structural design, achieve the effects of relative free rotations between the body and the light rotating arm as well as stable electric conductions, and also enable the body and the light rotating arm to be relatively positioned at multiple predetermined positions thereby improving the life span and the reliability of the pivotally rotating positioner. Besides, more compatible functions can be added in order to effectively assist devices such as a mobile phone and a tablet computer, thus expanding the application flexibility. It should be noticed that, however, the illustrations set forth as above simply describe the preferred embodiments of the present invention which are not to be construed as restrictions for the scope of the present invention; contrarily, all effectively equivalent changes and modifications conveniently made in accordance with the claims and specifications disclosed in the present invention are deemed to be encompassed by the scope of the present invention delineated in the following claims.

What is claimed is:

1. A pivotally rotating positioner for a support illuminating multi-task device, which is used to conductively connect a light rotating arm to a body in a fashion of pivotal rotations at variable angles, wherein the body comprises a base housing and a power supply assembly installed within the base housing, the base housing is configured with at least a pair of positioning through-holes; and the light rotating arm comprises a pair of rotating arm cases and a blocking part installed on the aforementioned pair of rotating arm cases, wherein the aforementioned pair of rotating arm cases are respectively configured with a penetrating part corresponding to one of the aforementioned positioning through-holes, and the blocking part further includes a light source formed by a set of light emitting diodes, the pivotally rotating positioner comprising:

a pair of electrically conductive pivotal axis assemblies, each of the aforementioned electrically conductive pivotal axis assembly respectively having two mutually opposite radial expansion position-limiting parts, and a radial contracting part located between the aforementioned radial expansion position-limiting parts, in each of the aforementioned conductive pivotal axis assembly the radial contracting part respectively penetrating correspondingly the aforementioned penetrating part and the aforementioned positioning through-hole, thereby limiting the greatest distance between the aforementioned base housing and the aforementioned rotating arm case by means of the aforementioned radial expansion position-limiting part such that the aforementioned rotating arm case can be combined to the aforementioned body in a fashion of pivotal rotations;

a pair of electrically conductive springs, respectively sleeve installed on the aforementioned radial contracting part of the aforementioned electrically conductive pivotal axis assembly, and one end of the aforementioned electrically conductive spring being conductively abutted against one of the aforementioned radial expansion position-limiting part so as to provide an elastic push force to abut thereon such that the aforementioned base housing and the aforementioned rotating arm case can be elastically and tightly coerced with each other;

two sets of snapping recesses and snapping bumps, respectively formed on the aforementioned base housing and the aforementioned rotating arm case thus allowing the aforementioned rotating arm case to be relatively positioned at at least two predetermined positions upon pivotally rotating relatively to the aforementioned base housing along the aforementioned electrically conductive pivotal axis assembly.

2. The pivotally rotating positioner for a support illuminating multi-task device according to claim 1, wherein each set of the aforementioned electrically conductive pivotal axis assembly respectively includes a metal screw bolt and a metal screw nut, the aforementioned metal screw bolt further comprising a screw head acting as the aforementioned radial expansion position-limiting part and screw teeth acting as the aforementioned radial contracting part, and the aforementioned metal screw nut acting as the other aforementioned radial expansion position-limiting part.

3. The pivotally rotating positioner for a support illuminating multi-task device according to claim 1, further comprising two conductive line segments respectively connected to the aforementioned electrically conductive spring and respectively extending along the aforementioned rotating arm case.

4. The pivotally rotating positioner for a support illuminating multi-task device according to claim 3, wherein the aforementioned conductive line segments respectively and integrally extend from the aforementioned electrically conductive spring.

5. The pivotally rotating positioner for a support illuminating multi-task device according to claim 1, wherein the aforementioned snapping recesses and the aforementioned snapping bumps are respectively plural and mutually demonstrate a radially symmetric distribution along the aforementioned electrically conductive pivotal axis assembly.

6. A support illuminating multi-task device having a pivotally rotating positioner, comprising:

a body, including a base housing and a power supply assembly installed within the base housing, with the base housing being configured with at least a pair of positioning through-holes;

a light rotating arm conductively connected to the body in a fashion of pivotal rotations at variable angles, which further includes a pair of rotating arm cases and a blocking part installed on the aforementioned rotating arm case, wherein the aforementioned rotating arm cases are further respectively configured with a penetrating part corresponding to one of the aforementioned positioning through-holes, and the blocking part further includes a light source formed by a set of light emitting diodes; and a set of pivotally rotating positioners, comprising:

a pair of electrically conductive pivotal axis assemblies, each of the aforementioned electrically conductive pivotal axis assembly respectively having two mutually opposite radial expansion position-limiting parts, and a radial contracting part located between the aforementioned radial expansion position-limiting parts, in the aforementioned conductive pivotal axis assembly the radial contracting part respectively penetrating correspondingly the aforementioned penetrating part and the aforementioned positioning through-hole, thereby limiting the farthest distance between the aforementioned base housing and the aforementioned rotating arm case by means of the aforementioned radial expansion position-limiting part such that the aforementioned rotating arm case can be combined to the aforementioned body in a fashion of pivotal rotations;

a pair of electrically conductive springs, respectively sleeve installed on the aforementioned radial contracting part of the aforementioned electrically conductive pivotal axis assembly, and one end of the aforementioned electrically conductive spring being conductively abutted against one of the aforementioned radial expansion position-limiting part so as to provide an elastic push force to abut thereon such that the aforementioned base housing and the aforementioned rotating arm case can be elastically and tightly coerced with each other;

two sets of snapping recesses and snapping bumps, respectively formed on the aforementioned base housing and the aforementioned rotating arm case thus allowing the aforementioned rotating arm case to be relatively positioned at at least two predetermined positions upon pivotally rotating relatively to the aforementioned base housing along the aforementioned electrically conductive pivotal axis assembly.

7. The support illuminating multi-task device including a pivotally rotating positioner according to claim 6, wherein the aforementioned power supply assembly further comprises a set of rechargeable battery installed inside the base housing.

8. The support illuminating multi-task device including a pivotally rotating positioner according to claim 6, wherein the aforementioned body further comprises a set of USB HUB module installed inside the base housing.

9. The support illuminating multi-task device including a pivotally rotating positioner according to claim 6, wherein the aforementioned body further comprises a plurality of connection ports installed on the base housing.

10. The support illuminating multi-task device including a pivotally rotating positioner according to claim 6, wherein each set of the aforementioned electrically conductive pivotal axis assembly in the pivotally rotating positioner respectively includes a metal screw bolt and a metal screw nut, the aforementioned metal screw bolt further comprising a screw head acting as the aforementioned radial expansion position-limiting part and screw teeth acting as the aforementioned radial contracting part, and the aforementioned metal screw nut acting as the other aforementioned radial expansion position-limiting part.

11. The support illuminating multi-task device including a pivotally rotating positioner according to claim 6, wherein the pivotally rotating positioner further comprises two conductive line segments respectively connected to the aforementioned electrically conductive spring and respectively extending along the aforementioned rotating arm case.

12. The support illuminating multi-task device including a pivotally rotating positioner according to claim 11, wherein the aforementioned conductive line segments respectively and integrally extend from the aforementioned electrically conductive spring.

13. The support illuminating multi-task device including a pivotally rotating positioner according to claim 6, wherein the aforementioned snapping recesses and the aforementioned snapping bumps in the aforementioned pivotally rotating positioner are respectively plural and mutually demonstrate a radially symmetric distribution along the aforementioned electrically conductive pivotal axis assembly.

\* \* \* \* \*